L. J. KNOWLES.
HARNESS FRAME.
No. 180,599. Patented Aug. 1, 1876.
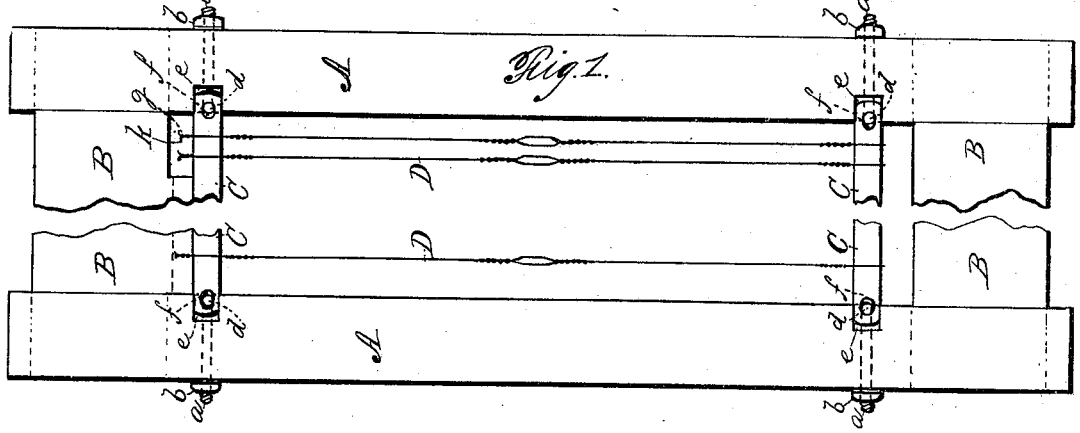
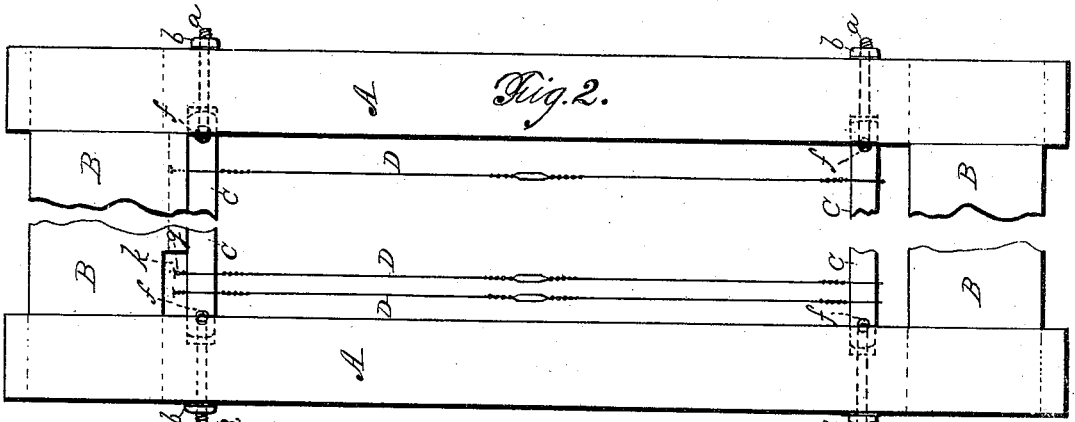
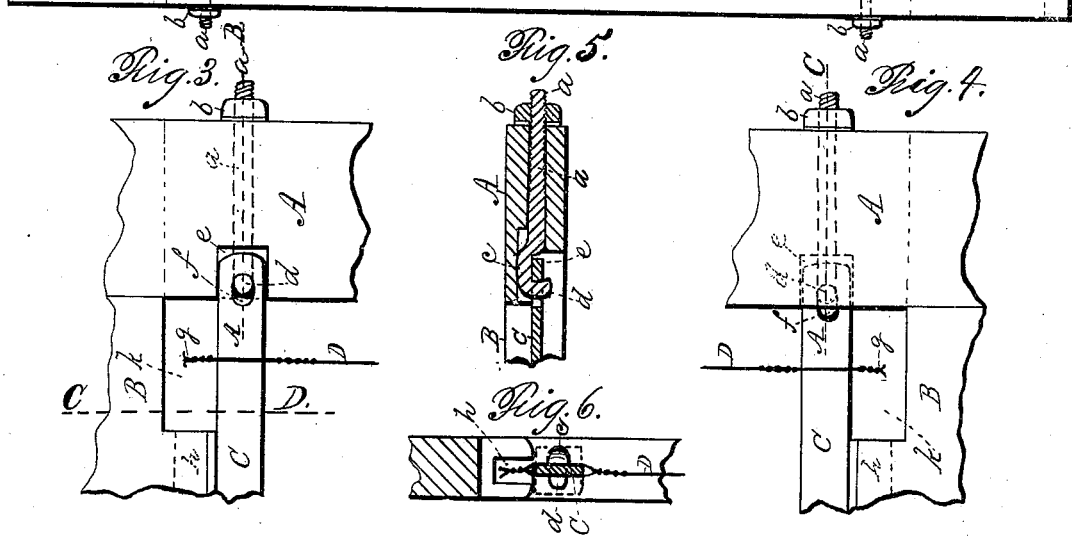
Witnesses:
Edwin E. Moore
Thos. H. Dodge
Inventor:
Lucius J. Knowles

UNITED STATES PATENT OFFICE.

LUCIUS J. KNOWLES, OF WORCESTER, MASSACHUSETTS.

IMPROVEMENT IN HARNESS-FRAMES.

Specification forming part of Letters Patent No. 180,599, dated August 1, 1876; application filed October 11, 1875.

*To all whom it may concern:*

Be it known that I, LUCIUS J. KNOWLES, of the city and county of Worcester, and Commonwealth of Massachusetts, have invented certain new and useful Improvements in Harness-Frames; and I do hereby declare that the following is a full, clear, and exact description of the same, reference being had to the accompanying drawings, forming a part of this specification, and in which—

Figure 1 represents so much of one side of a harness-frame as is necessary to illustrate my present improvements, said parts so represented being the end parts of the frame, as will be hereafter explained. Fig. 2 represents an opposite side view of the parts shown in Fig. 1, as will be hereafter explained. Fig. 3 represents, upon an enlarged scale, a side view of a section of one corner of the frame, as will be hereafter explained. Fig. 4 represents, upon an enlarged scale, an opposite side view of the parts shown in Fig. 3. Fig. 5 represents, upon an enlarged scale, a section on lines A B and A C, Figs. 3 and 4; and Fig. 6 represents, upon an enlarged scale, a section on line C D, Fig. 3.

To enable those skilled in the art to which my invention belongs to make and use the same, I will proceed to describe it more in detail.

In the drawings, the parts marked A A represent the end pieces of the harness-frame, which are connected together by means of top and bottom pieces B B. Each end piece A A is provided with two holes for the passage of heddle-bar-holding bolts a, said bolts being provided with screw-threads to receive the nuts b. The inner ends of bolts a are provided with a bent part, c, and a hook, d, the latter being inclined back slightly toward its screw end, as indicated in Fig. 3. C C are the heddle-bars for properly supporting the metallic heddles D D; said heddles, being made in the usual manner, need not be further described. The end pieces A are recessed or cut out, as shown at e e, to allow the hooked ends of the bolts a to drop down, so as to hold the heddle-bars C in a central position, as shown in Fig. 5, the bends c fitting into corresponding recesses in the backs of the notches e, whereby the bolts a can be moved back and forth for tightening or loosening the heddle-bars C, as fully shown in the same figure. The ends of the heddle-bars C fit into the notches e, so as to be supported therein upon their edges and one side, and consequently, when nuts a are turned up so as to draw the hooks d, which hook into hole f in the ends of the heddle-bars C, the latter will be drawn taut in horizontal positions for supporting the heddles D thereon, while, when the harness is in operation, the heddle-bars are prevented from turning by reason of their ends fitting into notches e in the end pieces A, as before explained. As the hooked ends d incline back slightly, they hold the bars securely against any liability of slipping off of said hooked ends.

The ends g of the heddles D are made by twisting two ends of the wire together, and as said ends are liable to be bent out so as to scratch or abrade the harness-frames during the operation of the loom, one cross-piece, B, is made with a groove, h, into which the ends g can be slipped, as fully shown in dotted lines, Figs. 1 and 2; and to accomplish this the grooved edge is cut away for a short distance, as shown at k, whereby the heddles can be conveniently slipped upon their respective bars, and then slid laterally, so that their ends g will pass into groove h, which fully protects them from becoming bent out so as to scratch or abrade the harness-frames during the operation of the loom. It will also be observed that the bend c, fitting as it does in a slot in the back of the notch e, keeps the bolt a from turning when it is tightened or loosened. It will be understood that the parts shown in Figs. 1 and 2 only represent the ends of the harness-frame for the purpose of illustrating my invention, and that in the construction of the frame the cross-pieces B B are to be of any desired length, and the groove h is to extend the entire length of one of the cross-pieces B, with only one corner, k, cut out, as before explained, for the purpose of allowing the heddles D to be strung upon their bars C C, after which they are to be slipped laterally into the positions which they are to occupy when in use in the loom, only three of the heddles being shown in the drawings, they being sufficient to illustrate my improvements.

I am aware of Letters Patent to Pratt, No. 162,191, dated April 20, 1875, and make no claim to what is shown or described therein.

Having described my improvements in harness-frames for receiving and supporting metallic heddles, what I claim therein as new and of my invention, and desire to secure by Letters Patent, is—

The combination, substantially as set forth, of the hook-bolts, formed as specified, the heddle-bars, and the harness-frame end pieces, formed to receive the hooks and the ends of the bars, as shown and described, whereby the points of the hooks are brought within the compass of the frame, the hooks are supported on their edges and on one side, and the heddle-bars are also supported and prevented from turning.

LUCIUS J. KNOWLES.

Witnesses:
E. E. MOORE,
THOS. H. DODGE.